Oct. 5, 1943.  W. I. TREADWAY  2,331,249
FISHING REEL
Filed Nov. 15, 1941
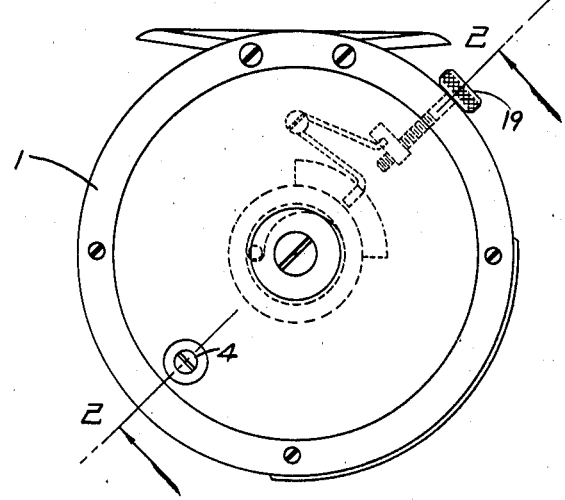
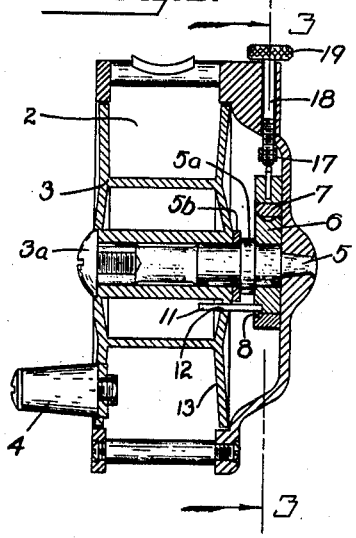
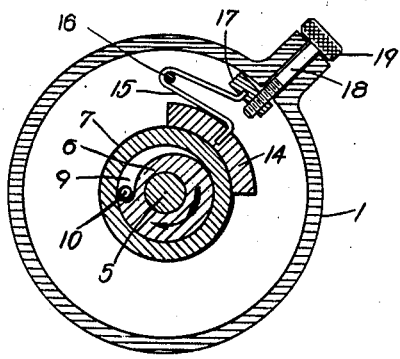
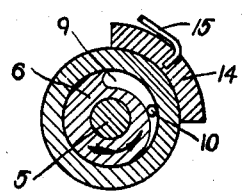
INVENTOR
William I. Treadway
By
ATTORNEY Patented Oct. 5, 1943

2,331,249

UNITED STATES PATENT OFFICE 2,331,249

FISHING REEL

William I. Treadway, Bristol, Conn., assignor to The Horton Manufacturing Company, a corporation of Connecticut Application November 15, 1941, Serial No. 419,307

6 Claims. (Cl. 242—84.5)

My invention relates to fishing reels.

It has among its objects to provide an improved reel and, more particularly, an improved fly reel. Further objects of my invention are to provide an improved and simplified brake connecting and disconnecting mechanism for such a reel, and to provide such a mechanism whereby it is made possible to eliminate any need for a ratchet. Another object is to provide such a mechanism wherein, while automatically connecting and disconnecting the brake as the direction of rotation of the spool is reversed, it is also made possible to eliminate any click and produce a silent reel. Still another object of my invention is to provide an improved connection between one of the elements of my improved brake operating mechanism and the spool whereby the latter is readily and quickly connected to or disconnected from said element in such manner as to facilitate insertion or removal of the spool whenever desired. These and other objects and advantages of my improvements will, however, hereinafter more fully appear.

In the accompanying drawing, I have shown for purposes of illustration one embodiment which my invention may assume in practice when embodied in a right hand reel.

In this drawing:

Figure 1 is a side elevation of a reel equipped with my improvements, certain of the elements being shown in dotted lines to facilitate illustration;

Fig. 2 is a section on line 2—2 of Figure 1;

Fig. 3 is a section on line 3—3 of Figure 2, and

Fig. 4 is a detail of the clutch when the spool is reversely rotated.

In this illustrative construction, I have shown a reel comprising a spool casing 1 having usual connections for connecting the same to a rod, and a side spool aperture 2 having a spool 3 therein carrying a usual handle or knob 4, and journalled on a post 5 fixed to the casing and extending axially into the spool aperture 2; improved clutch means, controlled by the direction of rotation of the spool 3, being provided for automatically applying and releasing a brake, and improved driving connections also being provided between one of the clutch elements and the spool, all as hereinafter described.

Referring more particularly to the clutch connections, it will be noted that the post 5 has a ring 6 journaled thereon and disposed between a collar 5a on the post 5 and the adjacent wall of the spool casing 1. Further, it will be observed that an outer ring member 7 encloses the ring member 6 and is retained against longitudinal separation therefrom by an annular flange 8 on the latter member. Between these ring members, an improved overrunning clutch mechanism is also provided, herein including an eccentric groove 9 in the outer periphery of the ring 6 and a ball 10 disposed in said eccentric groove 9 and adapted to be freely movable by gravity in the groove when the member 6 is rotated in one direction in such manner as to enable it to rotate freely, and also adapted to be wedged in the shallow end of the groove 9 when the member 6 is rotated in the opposite direction, and thus engage the inner periphery of the member 7 and thereby connect the members 6 and 7 for rotation together.

Herein, improved separable driving connections are also provided between the ring members 6 and 7 and the spool 3. As shown, the member 6 carries a laterally extending pin 11 projecting into the spool aperture 2 and adapted to be received in a corresponding aperture 12 in an adjacent face 13 of the spool 3. Thus, when the spool 3 is inserted part way in the aperture 2 and rotated to bring the aperture 12 into registry with the protruding end of the pin 11, the spool then may be fully inserted in the recess, as shown in Figure 2, with its hub in engagement with a washer 5b between the same and the collar 5a. A usual spool connecting screw 3a is threaded into the post 5 to hold the parts in assembled relation.

Cooperating with the clutch mechanism and automatically applied or released when the member 6 is rotated reversely by the spool 3 through the pin 11, is a suitable brake mechanism. Herein, this includes a brake shoe 14 which acts on the outer periphery of the ring member 7 and which is resiliently pressed against the latter by a U-shaped spring 15 extending around a pin 16 on the inside of the casing 1; this spring herein having extensions on its opposite ends seated in the shoe 14 and in an adjusting nut 17 adjustable on an adjusting screw 18 having a knurled outer end 19 on the outside of the casing.

In the operation of my improved construction, it will be evident that when the spool 3 is rotated in a direction to wind in the line, the member 6 will be rotated by the pin 11 in such a direction as to cause the ball 10 to remain freely movable in the eccentric groove 9 and, accordingly, permit the ring member 6 to rotate freely within the ring member 7, and therefore free from any braking effect of the brake shoe 14 which acts constantly on the ring 7. When, as in Figure 4, the direction of rotation of the ring 6 is reversed, the ball 10 will wedge in the small end of the eccentric groove 9 in such manner as to engage the inner periphery of the member 7 and thereby automatically connect the ring members 6 and 7 and, accordingly, cause the spool to be braked by the friction of the brake shoe 14 on the member 7.

As a result of my improved construction, not only is all need for providing a ratchet eliminated, but the ball and groove construction provided is one which automatically insures the desired connection between the cooperating rings and at the same time produces a silent reel free from the click heretofore associated with such ratchet mechanisms. Moreover, the concentric ring structure with the ball and groove clutch therebetween produces a construction which is adapted to be economically produced and readily assembled, while also being compactly disposed in the reel casing and having the groove and ball so disposed between the rings as to be protected against the entry of foreign matter into the same. Further, through the pin connection between the inner ring and the spool, it is made possible to remove the spool readily and quickly whenever desired upon merely removing the usual positioning screw seated in the end of the spool post. The construction is also such as to enable the spool structure to be of maximum simplicity, all of the clutch mechanism being confined to the rings and it only being necessary to provide the aperture 12 in the spool to receive the driving pin 11. Other advantages of my improved construction will also be apparent to those skilled in the art.

While I have herein specifically described one embodiment which my invention may assume in practice, it will be understood that this form has been shown for purposes of illustration, and that the invention may be modified and embodied in other forms without departing from its spirit or the scope of the appended claims.

What I claim as new and desire to secure by Letters Patent is:

1. A fishing reel having a spool post, a spool rotatable thereon, and spool braking mechanism including a braked ring, a driving ring rotatable on the outer periphery of said post by said spool, and a silent clutch between said rings having a frictional engaging member engageable with one of them controlled by the direction of rotation of said driving ring.

2. A fishing reel having a spool post, a spool rotatable thereon, and spool braking mechanism including an outer braked ring, an inner driving ring rotatable on the outer periphery of said post by said spool, and an overruning clutch between said rings directly engageable with the outer ring and controlled by the direction of rotation of said driving ring.

3. In a fishing reel, a spool post, concentric revolvable rings thereon including an inner ring rotatable about the outer periphery of said post, an overrunning clutch between said rings including an eccentric groove and rotatable means therein, a brake operating on one of said rings, and a spool rotatable on said post and rotating said inner ring, said clutch being carried by said inner ring and said brake acting upon the outer ring.

4. In a fishing reel, a spool post, concentric revolvable inner and outer rings thereon including an inner ring rotatable about the outer periphery of said post, an overrunning clutch between said rings including an eccentric groove in said inner ring and a rotatable element in said groove, a brake operating on the outer ring, a spool rotatable on said post, a laterally projecting pin on the inner ring, and an aperture in said spool receiving said pin.

5. A fishing reel having a spool post, a spool rotatable thereon, a brake member, a ring concentric with the spool engaged by said member, a driving ring rotatable on said post by said spool and located in close proximity to said first ring, and a silent clutch between said rings having frictional engagement with one of them and controlled by the direction of rotation of the driving ring.

6. A fishing reel having a spool post, a spool rotatable thereon, a brake member, a ring concentric with the spool engaged by said member, a driving ring rotatable on said post by said spool and located in close proximity to said first ring, and a silent clutch between said rings having frictional engagement with one of them and controlled by the direction of rotation of the driving ring, one of said rings being cut away at its periphery to provide said clutch and one of said rings being engageable by the clutch at any point in its periphery.

WILLIAM I. TREADWAY.